(12) United States Patent
Angell et al.

(10) Patent No.: US 7,965,977 B2
(45) Date of Patent: Jun. 21, 2011

(54) REMOTE ANTENNA SYSTEM

(75) Inventors: Richard Barry Angell, Nevada City, CA (US); Steve Maher, Grass Valley, CA (US)

(73) Assignee: 2Wire, Inc., San Jose, CA (US)

( * ) Notice: Subject to any disclaimer, the term of this patent is extended or adjusted under 35 U.S.C. 154(b) by 1097 days.

(21) Appl. No.: 11/787,919

(22) Filed: Apr. 17, 2007

(65) Prior Publication Data

US 2008/0175212 A1 Jul. 24, 2008

Related U.S. Application Data

(60) Provisional application No. 60/793,090, filed on Apr. 18, 2006.

(51) Int. Cl.
*H04B 3/36* (2006.01)

(52) U.S. Cl. ............ 455/7; 455/11.1; 455/13.1; 455/16; 370/279

(58) Field of Classification Search .............. 455/7, 11.1, 455/13.1, 16, 403; 370/73, 91, 123, 127.2, 370/137.3, 129, 550.1, 371, 279
See application file for complete search history.

(56) References Cited

U.S. PATENT DOCUMENTS

| | | | |
|---|---|---|---|
| 4,121,054 A | | 10/1978 | Popkin |
| 4,157,567 A | | 6/1979 | Scholz |
| 4,334,303 A | * | 6/1982 | Bertin et al. ................... 370/243 |
| 4,763,104 A | | 8/1988 | Inoue et al. |
| 5,924,022 A | * | 7/1999 | Beasley et al. ................. 455/218 |
| 6,122,083 A | * | 9/2000 | Ohta et al. ........................ 398/1 |
| 6,262,905 B1 | | 7/2001 | Zhang et al. |
| 6,297,620 B1 | | 10/2001 | Goodrich, II |
| 6,345,390 B1 | * | 2/2002 | Eto et al. ......................... 725/127 |
| 6,370,203 B1 | * | 4/2002 | Boesch et al. ................. 375/297 |
| 6,449,348 B1 | | 9/2002 | Lamb et al. |
| 6,665,404 B2 | | 12/2003 | Cohen |
| 6,975,723 B2 | | 12/2005 | Scott et al. |
| 7,149,903 B1 | | 12/2006 | Chan et al. |
| 7,305,006 B1 | | 12/2007 | Bella |
| 7,415,242 B1 | * | 8/2008 | Ngan ............................. 455/11.1 |
| 2002/0003873 A1 | | 1/2002 | Rabenko et al. |
| 2002/0073434 A1 | | 6/2002 | Pience |
| 2002/0090962 A1 | | 7/2002 | Struhsaker et al. |
| 2002/0105931 A1 | * | 8/2002 | Heinonen et al. .............. 370/338 |
| 2002/0122496 A1 | | 9/2002 | Klein-Reesink |
| 2002/0136394 A1 | | 9/2002 | Snow et al. |
| 2003/0068033 A1 | | 4/2003 | Kiko |
| 2003/0215020 A1 | | 11/2003 | Dong et al. |
| 2005/0094604 A1 | * | 5/2005 | Ozluturk et al. ............... 370/335 |
| 2005/0180561 A1 | | 8/2005 | Hazani et al. |
| 2005/0256963 A1 | * | 11/2005 | Proctor Jr. et al. ............ 709/230 |

(Continued)

*Primary Examiner* — Kamran Afshar
*Assistant Examiner* — Marisol Fahnert
(74) *Attorney, Agent, or Firm* — Blakely, Sokoloff, Taylor & Zafman LLP.

(57) ABSTRACT

Various methods, apparatuses, and systems are described in which a WAP is coupled to an antenna unit and provides a wireless LAN. In one embodiment, the antenna unit includes at least one remote antenna circuit having one or more ports to receive a control signal and a transmit signal transmitted from the WAP located in a multi-tone transmitter-receiver. Each remote antenna circuit includes a transmit amplifier unit that amplifies the transmit signal, a receive amplifier unit that amplifies a receive signal, and control unit that receives the control signal. The control unit controls an operation of the transmit and the receive amplifier units to extend a range of the wireless WAP with the at least one remote antenna circuit.

9 Claims, 8 Drawing Sheets

U.S. PATENT DOCUMENTS

| | | |
|---|---|---|
| 2005/0272430 A1* | 12/2005 | Griebling ..................... 455/446 |
| 2006/0092671 A1 | 5/2006 | Yamashita |
| 2006/0159116 A1 | 7/2006 | Gerszberg et al. |
| 2006/0203981 A1 | 9/2006 | Binder |
| 2006/0215771 A1 | 9/2006 | Scott et al. |
| 2006/0225098 A1* | 10/2006 | James et al. .................... 725/63 |
| 2007/0085631 A1 | 4/2007 | Larson et al. |
| 2007/0242757 A1 | 10/2007 | Schley-May et al. |
| 2007/0263852 A1 | 11/2007 | Schley-May et al. |
| 2008/0235587 A1* | 9/2008 | Heie et al. ..................... 715/719 |

* cited by examiner

REMOTE ANTENNA SYSTEM

RELATED APPLICATIONS

The present application is related to and hereby claims the priority benefit of commonly-owned and co-pending U.S. Provisional Patent Application No. 60/793,090, entitled "NETWORK INTERFACE DEVICE" filed Apr. 18, 2006.

FIELD OF THE DISCLOSURE

Embodiments of the disclosure generally relate to telecommunication systems used to provide broadband access. More particularly, an aspect of an embodiment of the disclosure relates to providing broadband access with a remote antenna system.

BACKGROUND OF THE DISCLOSURE

Typically, telecommunication systems that provide broadband access to customers contain a multi-tone transmitter-receiver such as a residential gateway. The residential gateway consists of a xDSL (any type of digital subscriber line generally communicated over copper lines) modem or xPON (any type of passive optical network generally communicated over optic fibers) interface combined with various local area networking (LAN) technologies to enable sharing the broadband access with other computers or devices within the residence or building. Wireless local area network standards and home phone line networking (HPNA) are examples of such LAN technologies.

A wireless LAN or WLAN is a wireless local area network, which is the linking of two or more computers without using wires. WLAN utilizes spread-spectrum technology based on radio waves to enable communication between devices in a limited area, also known as the basic service set. This gives users the mobility to move around within a broad coverage area and still be connected to the network. A wireless access point (WAP) provides a wireless LAN by connecting to an Ethernet hub or switch. Each access point is a base station that transmits a radio frequency (RF) signal over a radius of some distance.

Typically the residential or DSL communication gateway is coupled to or includes a WAP which is located inside a building. However, it is desirable to locate the residential gateway and WAP at the network interface device (NID) outside the building. A NID is the point of demarcation between an Unbundled Network Element (UNE) loop and the end user's inside wire. Reasons for desirability of locating the residential gateway and WAP at the NID include to provide simplified installation wiring and to eliminate the need to have the user home when the bulk of installation occurs. Further, as fiber to the neighborhood rolls out, integration will be easier if the active electronics are already present at the NID. Also, installation practices can be merged between xPON and xDSL systems such that the primary network termination is the mere difference.

However, a significant problem in trying to locate the WAP at a NID located outside a building is the problem of transmitting the wireless signal through the walls of the building which significantly attenuates the wireless RF signal. Alternatively, current schemes for locating the WAP inside a building suffer from transferring the RF signal via coaxial cable into the building. The coaxial cable and associated splitters introduce a high signal loss at typical Institute of Electrical and Electronics Engineers (IEEE) 802.11 industrial, scientific, and medical (ISM) RF bands.

SUMMARY OF THE DISCLOSURE

Various methods, apparatuses, and systems are described in which a WAP is coupled to an antenna unit and provides a wireless LAN. In one embodiment, the antenna unit includes one or more remote antenna circuits having one or more ports to receive a control signal and a transmit signal transmitted from the WAP located in a multi-tone transmitter-receiver. Each remote antenna circuit includes a transmit amplifier unit that amplifies the transmit signal, a receive amplifier unit that amplifies a receive signal, and control unit that receives the control signal. The control unit controls an operation of the transmit and receive amplifier units to extend a range of the wireless WAP with the one or more remote antenna circuits.

BRIEF DESCRIPTION OF THE DRAWINGS

The drawings refer to embodiments of the disclosure in which.

Figure 1:
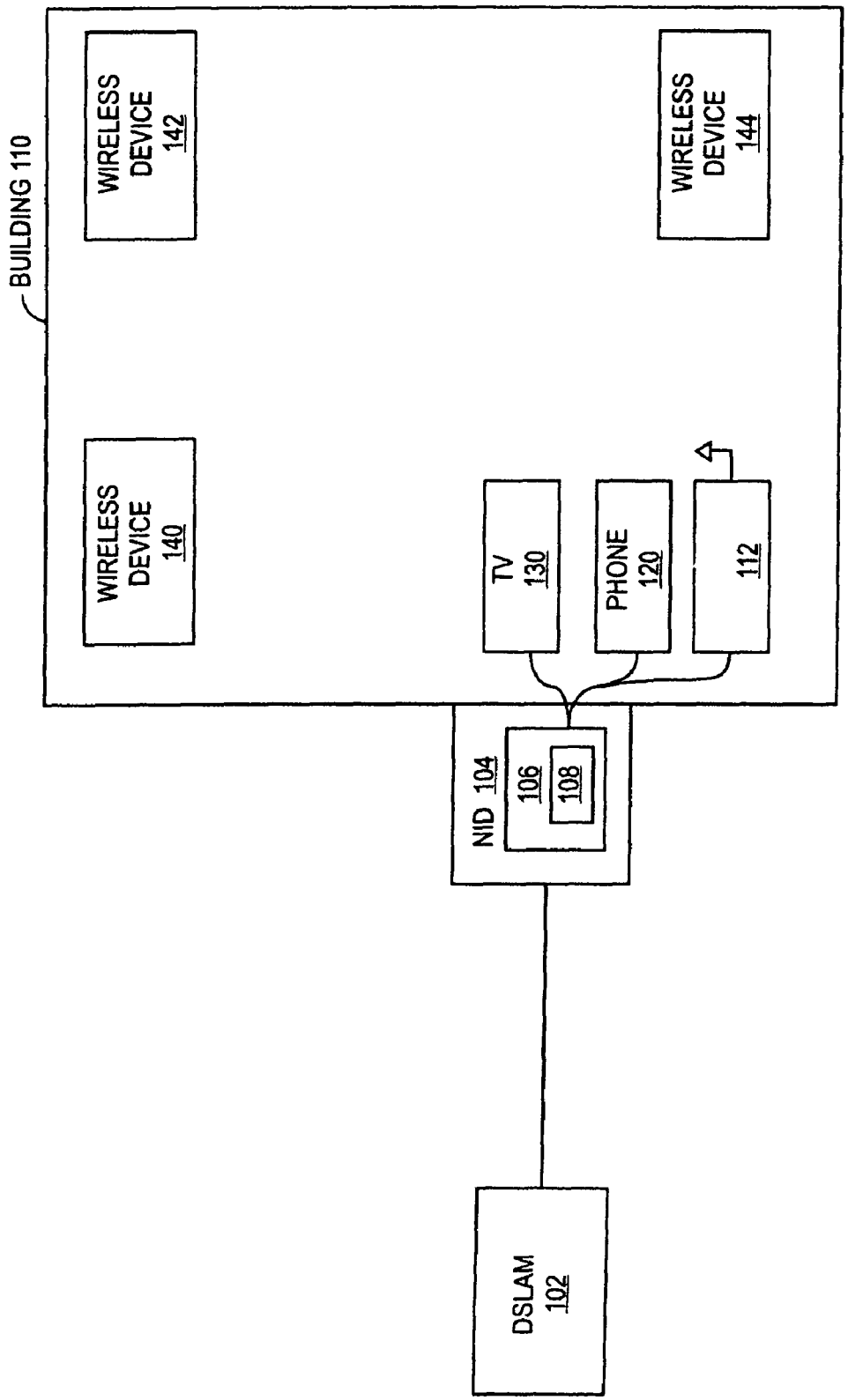
FIG. 1 shows a block diagram of an embodiment of a central office containing a Digital Subscriber Loop Access Multiplexer sending communications across an Unbundled Network Element (UNE) loop to a network interface device having a multi-tone transmitter-receiver with a WAP.

While the disclosure is subject to various modifications and alternative forms, specific embodiments thereof have been shown by way of example in the drawings and will herein be described in detail. The disclosure should be understood to not be limited to the particular forms disclosed, but on the contrary, the intention is to cover all modifications, equivalents, and alternatives falling within the spirit and scope of the disclosure.

DETAILED DISCUSSION

In the following description, numerous specific details are set forth, such as examples of specific signals, named components, connections, number of windings in a transformer, example voltages, etc., in order to provide a thorough understanding of the present disclosure. It will be apparent, however, to one of ordinary skill in the art that the present disclosure may be practiced without these specific details. In other instances, well known components or methods have not been described in detail but rather in a block diagram in order to avoid unnecessarily obscuring the present disclosure. The specific details set forth are merely exemplary. Further specific numeric references such as a first converter, may be made. However, the specific numeric reference should not be interpreted as a literal sequential order but rather interpreted that the first converter is different than a second converter. Thus, the specific details set forth are merely exemplary. The specific details may be varied from and still be contemplated to be within the spirit and scope of the present disclosure. The term coupled is defined as meaning connected either directly to the component or indirectly to the component through another component.

In general, various apparatuses and methods are described in which a WAP located in a wide area network communication gateway is coupled to an antenna unit in order to provide a wireless LAN. In at least certain embodiments, the antenna unit includes at least one antenna circuit having one or more ports to receive a control signal and a transmit signal transmitted from the WAP. Each antenna circuit includes a transmit amplifier unit that amplifies the transmit signal, a receive amplifier unit that amplifies a receive signal, and control unit that receives the control signal. The control unit controls an operation of the transmit and the receive amplifier units to extend a range of the WAP with the antenna unit.

In one embodiment, the control unit includes detector logic to detect a state of a bit in the control signal transmitted from the WAP. The control signal controls the operation of the transmit and receive amplifier units with the transmit and receive signals operating on substantially the same frequency band.

FIG. 1 shows a block diagram of an embodiment of a central office containing a Digital Subscriber Line Access Multiplexer (DSLAM) sending communications across an Unbundled Network Element (UNE) loop to a network interface device having a multi-tone transmitter-receiver with a WAP. A NID is the point of demarcation between the UNE loop and the end user's inside wire. The DSLAM 102 sends communications to the NID 104 located outside a building 110. The NID 104 includes a multi-tone transmitter-receiver 106 that routes various types of communications, such as data, voice, and video, into the building 110. The multi-tone transmitter-receiver may include one of a DSL modem, a cable modem, an optical fiber, a satellite modem, Ethernet, a coaxial cable data interface such as Multimedia over Coax Alliance (MoCA) or HPNA, and a wireless metropolitan area network in order to route the various types of communications which are sent to an antenna unit 112, television 130, and phone 120.

The antenna unit 112 includes one or more remote antenna circuit (RAC) with each RAC including one or more ports to receive a control signal and a transmit signal transmitted from the WAP 108 located in the multi-tone transmitter-receiver 106. Each RAC has a transmit amplifier unit that amplifies the transmit signal, a receive amplifier unit that amplifies a receive signal, and control unit that receives the control signal. The control unit controls an operation of the transmit and receive amplifier units to extend a range of the WAP 108 with the antenna unit 112.

In one embodiment, the multi-tone transmitter-receiver includes a residential gateway that is coupled to the antenna unit 112 via a coaxial line. In another embodiment, the multi-tone transmitter-receiver 106 includes a wide area network (WAN) modem that is coupled to the antenna unit 112 via a coaxial line. The WAN modem is located in the NID 104 that is located outside of the building 110. In some embodiments, the antenna unit 112 is located inside of the building 110 and the coaxial line is routed through the building. One or more RACs may be located in various rooms, levels, or floors of building 110.

In certain embodiments, the antenna unit 112 transmits 802.11 RF frequencies throughout the building 110 to various wireless devices 140, 142, and 144. A wireless device receives the 802.11 RF frequencies and also transmits back to the RAC 112 a communication that is sent from the antenna unit 112 to the WAP 106 to the DSLAM 102 in order to access the public telephone network or other wide or local area networks.

Figure 2:
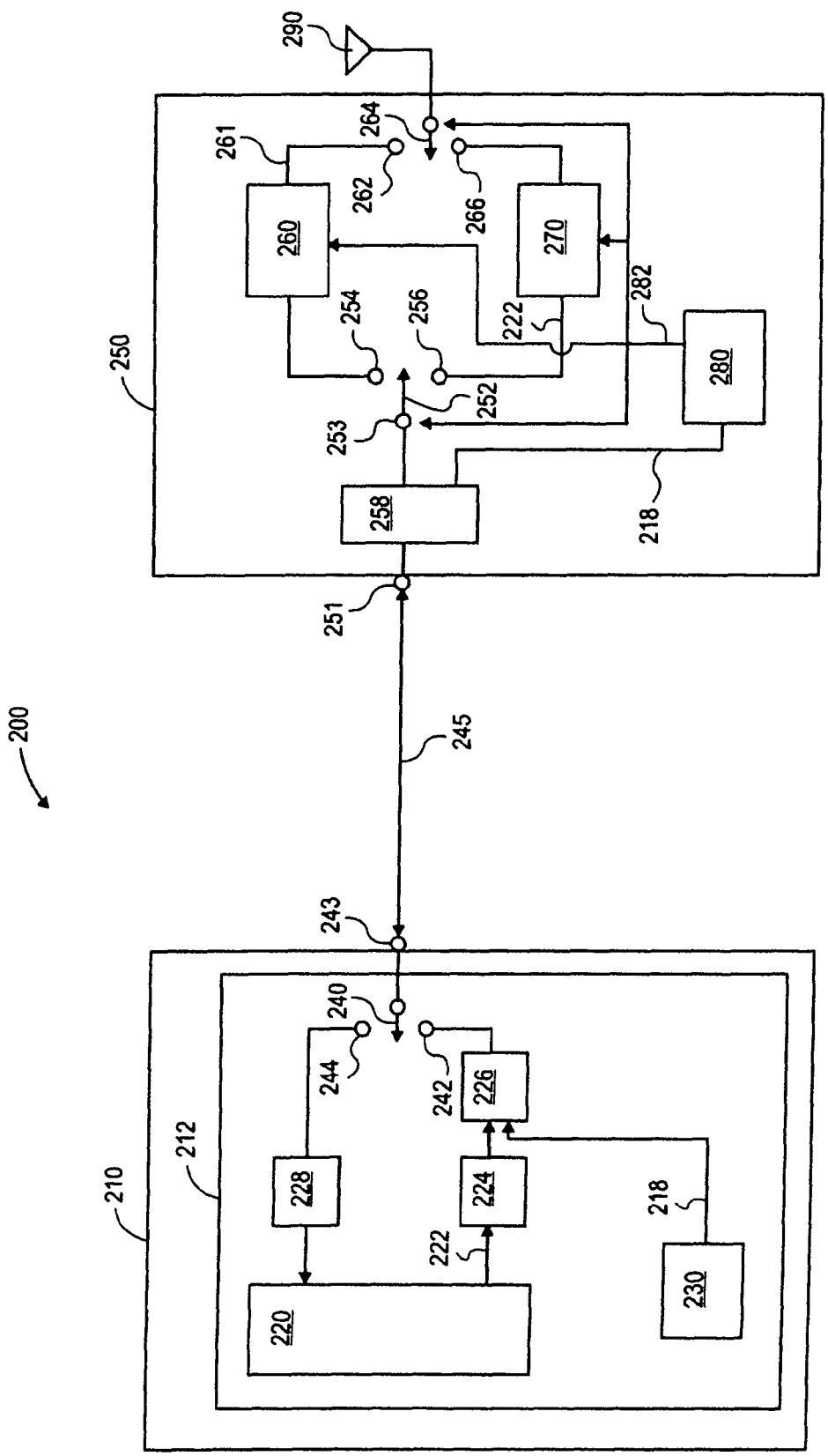
FIG. 2 shows a block diagram of an embodiment of a multi-tone transmitter-receiver having a WAP being coupled to an antenna circuit that extends a range of the WAP.

FIG. 2 shows a block diagram of an embodiment of a multi-tone transmitter-receiver having a WAP being coupled to an antenna circuit that extends a range of the WAP. The WAP 212 includes a radio 220, a diplexer 226, a control signal generator 230, and amplifiers 224 and 228.

In at least certain embodiments, the radio 220 generates a RF transmit signal 222 with a frequency range of 2 to 6 GigaHertz (GHz). The transmit signal 222 is sent from the radio 220 to the amplifier 224 to the diplexer 226 which also receives a control signal 218 that has been generated by the control signal generator 230. The diplexer 226 combines the transmit signal 222 and the control signal 218 and sends these signals to the node 242 for transmission to an antenna circuit 250 if a switch 240 which may be a semiconductor device has been switched to a transmit position by contacting the node 242.

The antenna circuit 250 has one or more ports 251 to receive the control signal 218 and the transmit signal 222 transmitted from the WAP 212 via one or more ports 243 of the multi-tone transmitter-receiver 210. The antenna circuit 250 includes a diplexer 258, a transmit amplifier unit 270 to amplify the transmit signal 222, a receive amplifier unit 260 to amplify a receive signal 261, and control unit 280 to receive the control signal 218. The control unit 280 controls an operation of the transmit amplifier unit 270 and the receive amplifier unit 260 to extend a range of the WAP 212 with the antenna circuit 250. The control unit 280 may include a control signal detector or demodulator to detect the control signal 218.

The diplexer 258 sends the control signal 218 to the control unit 280 and the transmit signal 222 to a node 253. If a transmit/receive switch 252 contacts node 256 then the transmit signal 222 is received by the transmit amplifier unit 270 which amplifies the transmit signal based on a control signal 282 generated by the control unit 280. The control signal 282 controls an operation of the transmit/receive switch 253, transmit amplifier unit 270, a transmit/receive switch 264 and receive amplifier unit 260.

In a transmit mode, the transmit amplifier unit 270 amplifies and sends the transmit signal 222 to a node 266 with switch 264 contacting node 266. An antenna 290 transmits the transmit signal 222 to wireless devices within a certain range of the antenna 290. In receive mode, the antenna 290 receives a receive signal 261 from various wireless devices. The receive amplifier unit 260 amplifies and sends the receive signal 261 to a node 254. The switch 252 switches to contact the node 254 permitting the receive signal 261 to be received by diplexer 258 which sends the receive signal 261 to the WAP 212. The switch 240 contacts a node 244 such that the receive signal 261 is received by the amplifier 228. The receive signal 261 is amplified by the amplifier 228 which sends this signal to the radio 220.

In one embodiment, the control unit 280 detects a state of a bit in the control signal 218 transmitted from the WAP 212 to control the operation of the transmit amplifier unit 270 and the receive amplifier unit 260 with the transmit signal 222 and the receive signal 261 operating on substantially the same frequency band. The transmit signal 222 and receive signal 261 are transferred between the WAP 212 and the antenna circuit 250 via a coaxial network 246 at the native frequency generated by the radio 220. The coaxial network 246 may include one or more cable lines and associated splitters.

In another embodiment, the control signal 218 includes a data channel that controls the operation of the transmit amplifier unit 270 and the receive amplifier unit 260. In a more elaborate system, the control channel may provide bi-directional communication. In this case several enhancements may be possible. A transmit automatic gain control (AGC) may operate by reducing the power output of the multi-tone transmitter-receiver, thus saving power. A loop back mode may then be activated, and the multi-tone transmitter-receiver may measure the loss in the receive channel. The multi-tone transmitter-receiver may then signal the remote receive amplifier to operate at an optimum gain setting.

In some embodiments, the radio 220 and an associated processor remain in the multi-tone transmitter-receiver 210. The coaxial network 246 is used to transmit the analog RF 802.11 transmit signal 222 to the remote (indoor) antenna circuit 250. Analog amplifiers 260 and 270 located at the antenna circuit 250 provide gain for transmission and reception.

In other embodiments, optional features include switches to control the signal path for transmit and receive functions at the antenna circuit 250. The control signal 218 originates at the multi-tone transmitter-receiver 210 and controls the remote transmit-receive switches 252 and 264. The control channel may be bi-directional. The control signal 218 is further used to analyze a loss of the coaxial channel. One or more gains of the amplifiers at one or both ends of the coaxial network 246 are adjusted based on the discovered channel characteristic.

Figure 3A:
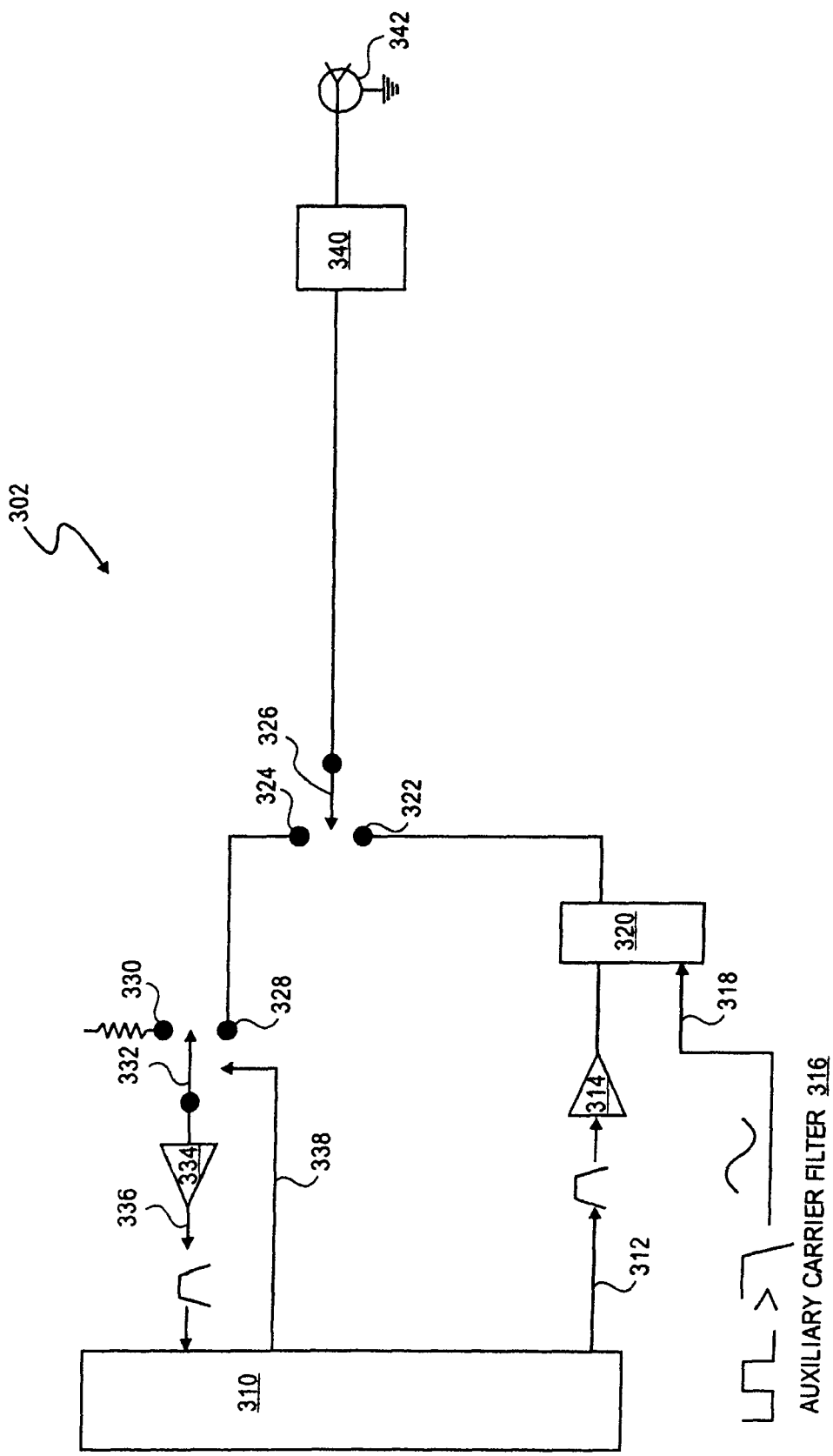
FIG. 3A shows a block diagram of an embodiment of a WAP located in a multi-tone transmitter-receiver.
Figure 3B:
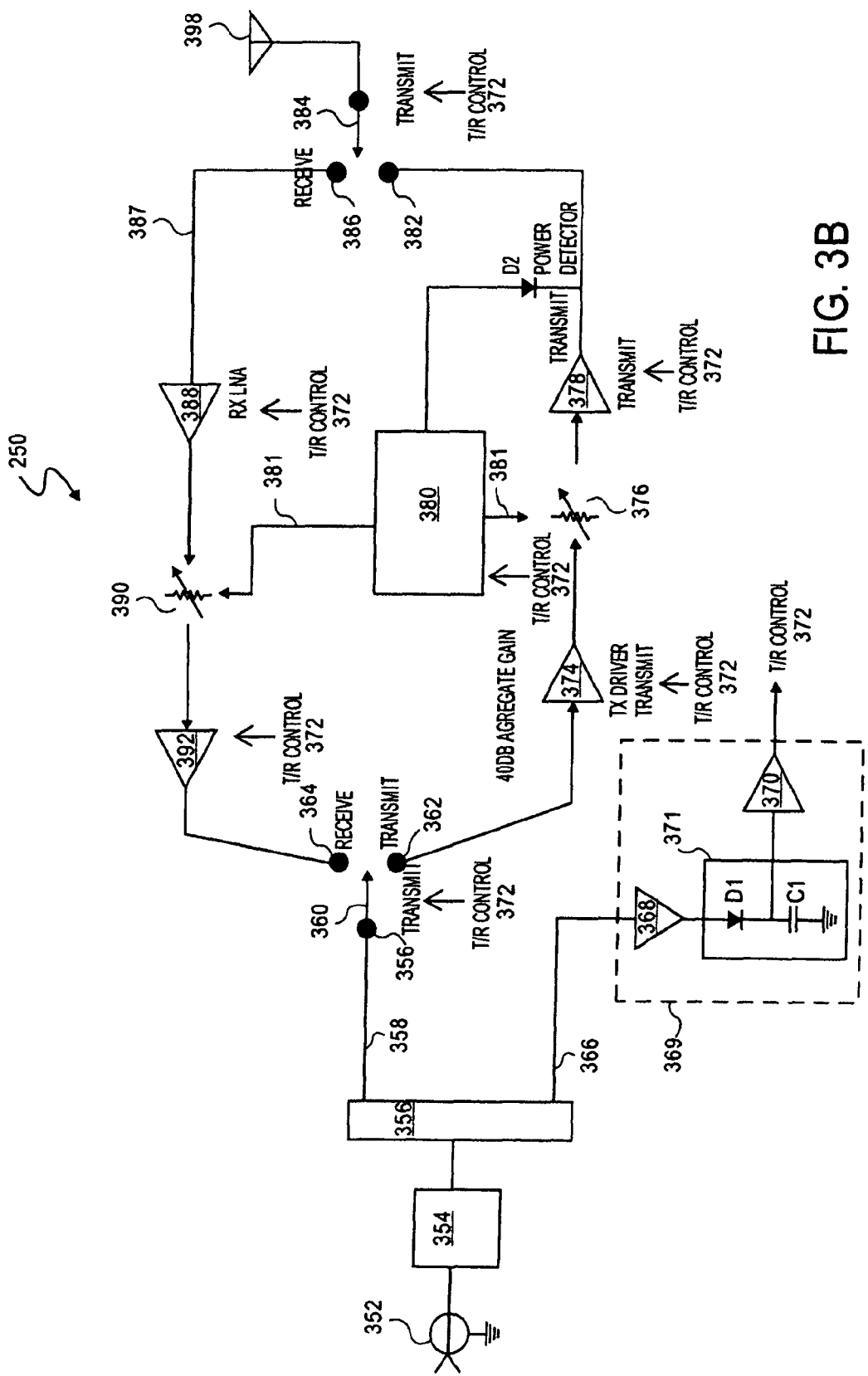
FIG. 3B shows a block diagram of an embodiment of an antenna circuit that extends a range of the WAP.

FIG. 3A shows a block diagram of an embodiment of a WAP located in a multi-tone transmitter-receiver. FIG. 3B shows a block diagram of an embodiment of an antenna circuit that extends a range of the WAP. In one embodiment, the WAP 302 is coupled to the antenna circuit 350 via a coaxial line.

The WAP 302 includes a radio 310, a diplexer 320, an impedance match block 340 and amplifiers 314 and 334. In at least certain embodiments, the radio 310 generates a RF transmit signal 312 with a frequency range of 2 to 6 GigaHertz (GHz). The transmit signal 312 is sent from the radio 310 to the amplifier 314 to the diplexer 320 which also receives a control signal 318 that has been filtered by an auxiliary carrier filter 316. The control signal 318 may be switched 'on' for transmit and 'off' for receive. The control signal 318 may be carrier modulated in amplitude or in phase, or both. The control signal 318 may be intermittent, merely being present for transmission, or it may be constant, with a data pattern encoded to signify transmit or receive.

The diplexer 320 combines the transmit signal 312 and the control signal 318 and sends these signals to the transmit node 322 for transmission to the impedance match block 340 if a switch 326 has been switched to a transmit position by contacting the node 322. In one embodiment, the impedance match block 340 is a 75 ohm to 50 ohm match block. A 75 ohm F connector 342 connects to a coaxial cable that transfers the transmit signal 312 and control signal 318 to a 75 ohm F connector 352 located in the antenna circuit 350.

The antenna circuit 350 includes a diplexer 356, transmit amplifiers 374 and 378 that amplify the transmit signal 312, receive amplifiers 388 and 392 that amplify a receive signal 387, and control unit 369 that receives the control signal 318. The control unit 369 controls an operation of the transmit amplifiers 374 and 378 and the receive amplifiers 388 and 392 with a transmit/receive (T/R) control signal 372 to extend a range of the WAP 302 with the antenna circuit 350.

The diplexer 356 sends the control signal 318 to the control unit 369 and the transmit signal 312 to a node 359. If a transmit/receive switch 360 contacts node 362 then the transmit signal 312 is received by the transmit amplifiers 374 and 378 which amplify the transmit signal 312 based on the T/R control signal 372 that controls an automatic gain controller (AGC) 380 and variable resistor 376. The control signal 322 controls an operation of the transmit/receive switches 360 and 384, transmit amplifiers 374 and 378, receive amplifiers 388 and 392, and AGC 380. The AGC 380 controls a gain of the transmit amplifier 378 based on a power detector D2 that detects the output power level of the transmit amplifier 378. The AGC 380 also controls a gain of the receive amplifier 392 based on the gain of the transmit amplifiers.

In one embodiment, the control unit 369 includes detector logic 371 to detect a state of a bit in the control signal 318 transmitted from the WAP 302 to control the operation of the transmit and receive amplifiers with the transmit and receive signals operating on substantially the same frequency band. The detector logic 371 may include a diode D1 and capacitor C1.

In a transmit mode, the transmit amplifier 378 amplifies and sends the transmit signal 312 to a node 382 with switch 384 contacting node 382. An antenna 398 transmits the transmit signal 312 to wireless devices within a certain range of the antenna 398. In receive mode, the antenna 398 receives a receive signal 261 from various wireless devices. The receive amplifiers 388 and 392 amplify and send the receive signal 387 to a node 364. The switch 360 switches to contact the node 364 permitting the receive signal 387 to be received by diplexer 356 which sends the receive signal 387 to the WAP 302. In FIG. 3A, the switches 326 and 332 contact a node 324 and a node 328, respectively, such that the receive signal 387 is received by the amplifier 334.

Prior approaches for providing a wireless LAN with a WAP have used bi-directional 802.11 amplifiers with no control unit or signal. A bi-directional amplifier senses an incoming transmit power level and uses this to toggle between transmission and reception. These amplifiers require a high transmit input level of approximately 10 dBm which is an abbreviation for the power ratio in decibel (dB) of the measured input power referenced to one milliwatt (mW). Since the loss in the cable network can be over 50 dB, this may require a transmit output power from the WAP 302 of 1 kilowatt (kW), an impractical level for this type of multi-tone transmitter-receiver. Also, it is difficult in such a system to achieve optimum gain, because the loss in the coaxial cable is unknown. If the amplifiers provide an insufficient amount of gain, then low receive sensitivity and low transmit output power occurs. If the amplifiers provide an excessive amount of gain, then distortion results which reduces the ability of the channel to carry information.

AGC circuits are problematic because the envelope of the 802.11 transmit signal is non-uniform. The AGC may have to track it slowly. The receive AGC is very difficult because different frames will arrive at different signal strengths, so the AGC must respond quickly to the received level. However, this fast response means that it may inadvertently track the envelope of the desired signal. This may render the resultant amplified 802.11 signal useless.

In one embodiment, the transmit signal 312 and received signal 387 each have a frequency range of 2 to 3 GHz which results in a high loss during the transfer across the coaxial cable between the WAP 302 and the antenna circuit 350. This control signal 318 typically has frequencies in the passband of any splitters in the path between the WAP 302 and the antenna circuit 350. In this case, a transmit AGC 380 controls the gain of the remote amplifiers that provide a high dynamic range and gain. The AGC value may be stored between transmissions. The response time of the transmit AGC 380 may be very slow, so as to avoid tracking the envelope of the transmit signal 312. Because the transmit level of the WAP 302 is known, the value of the T/R control signal 372 indicates the loss in the coaxial cable. Then, since the loss is symmetrical and fixed, the same AGC level may be used to add or subtract attenuation from the receive signal 387 as well. The AGC control of the transmit and receive signals provides a gain control method for the receive channel. Failure to adjust the receive gain may result in distortion due to too high a signal level, or excess noise due to too low a signal level.

In one embodiment, control unit 369 determines an amount of control signal loss from transmission of the control signal 318 over the coaxial line. The control unit 369 adjusts a gain of at least one of the transmit amplifier 378 and the receive amplifier 392 located in the antenna circuit 350 in response to the determination of the amount of the control signal loss. The control unit 369 may adjust a gain of at least one of the transmit amplifier 314 and the receive amplifier 334 located in the WAP 302 in response to the determination of the control signal loss.

Figure 4:
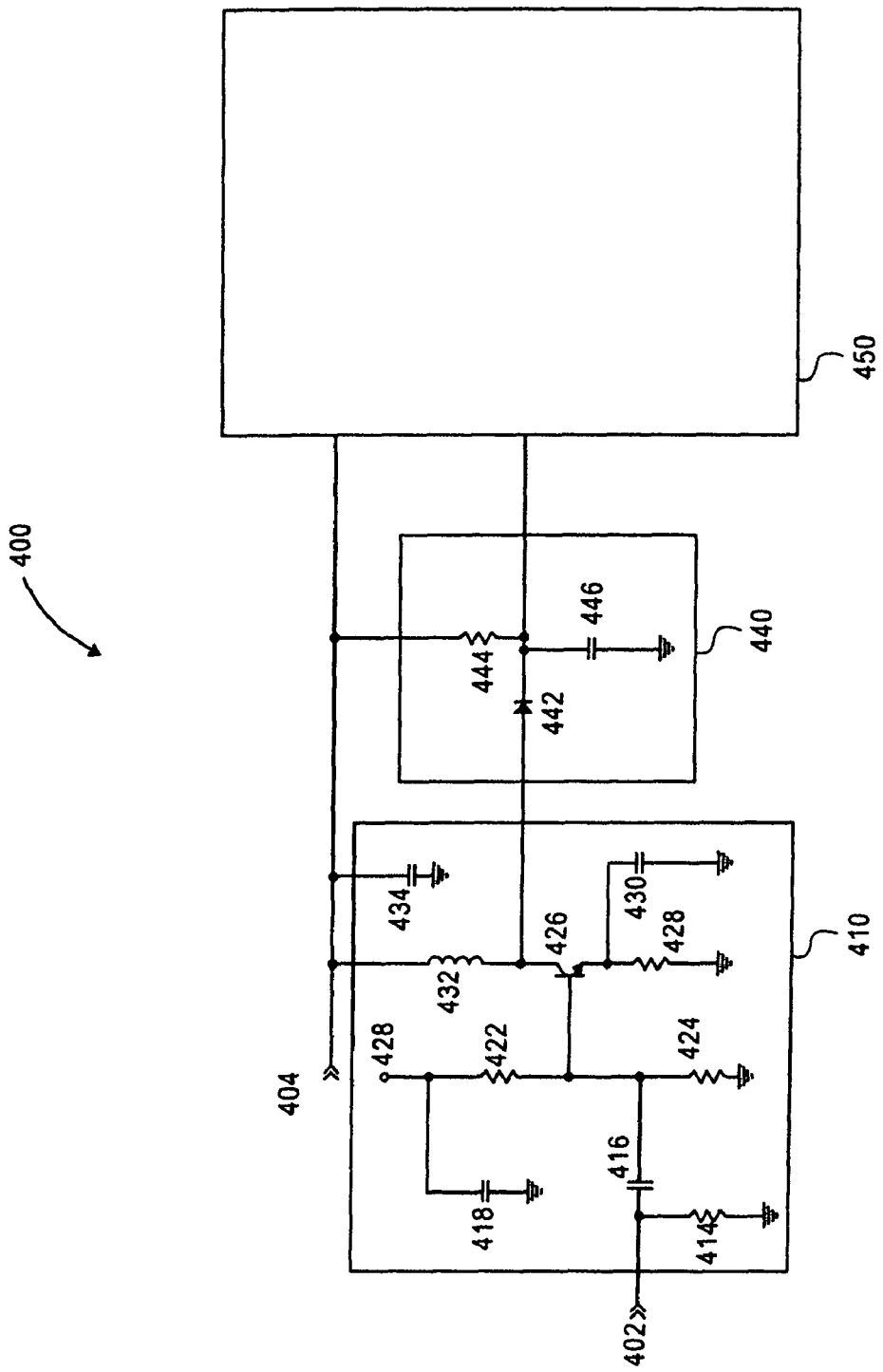
FIG. 4 shows a block diagram of an embodiment of control unit located in an antenna circuit that extends a range of a WAP.

FIG. 4 shows a block diagram of an embodiment of control unit located in an antenna circuit that extends a range of a WAP. The control unit 400 includes an amplifier 410, a detector 440, and a comparator 450. The amplifier 410 includes resistors 414, 422, 424, 428, capacitors 416, 418, 430, 434, inductor 432, and transistor 426. The amplifier 410 amplifies and filters the control signal 402 received from WAP 302. The transistor 426 may be configured as a standard common emitter amplifier. An inductance value of the inductor 432 is chosen to resonate with an output capacitance of the transistor 426. This is a way of using an inexpensive transistor to achieve high gain at a frequency of the control signal 402 with a range of 10 to 1000 MHz. The amplifier 410 amplifies the control signal 402 to a high enough voltage to be detected by a diode 442 of the detector 440. At the same time, the amplifier 410 rejects out-of-band signals, such as the 802.11 transmit signal 312, which operates at a much higher frequency in a range of 2 to 6 GHz.

The detector 440 includes the diode 442, a capacitor 446, and a resistor 444. In the presence of a large control signal 402, the diode 442 rectifies the control signal 402 and the voltage on the capacitor 446 exceeds a supply voltage of the control unit 400. The comparator 450 compares the rectified voltage on the capacitor 446 to a reference voltage developed by a resistor or other similar means. If the rectified voltage exceeds the reference voltage, the comparator output changes state, thus controlling the RF switches and RF amplifiers illustrated in FIGS. 2 and 3.

Figure 5A:
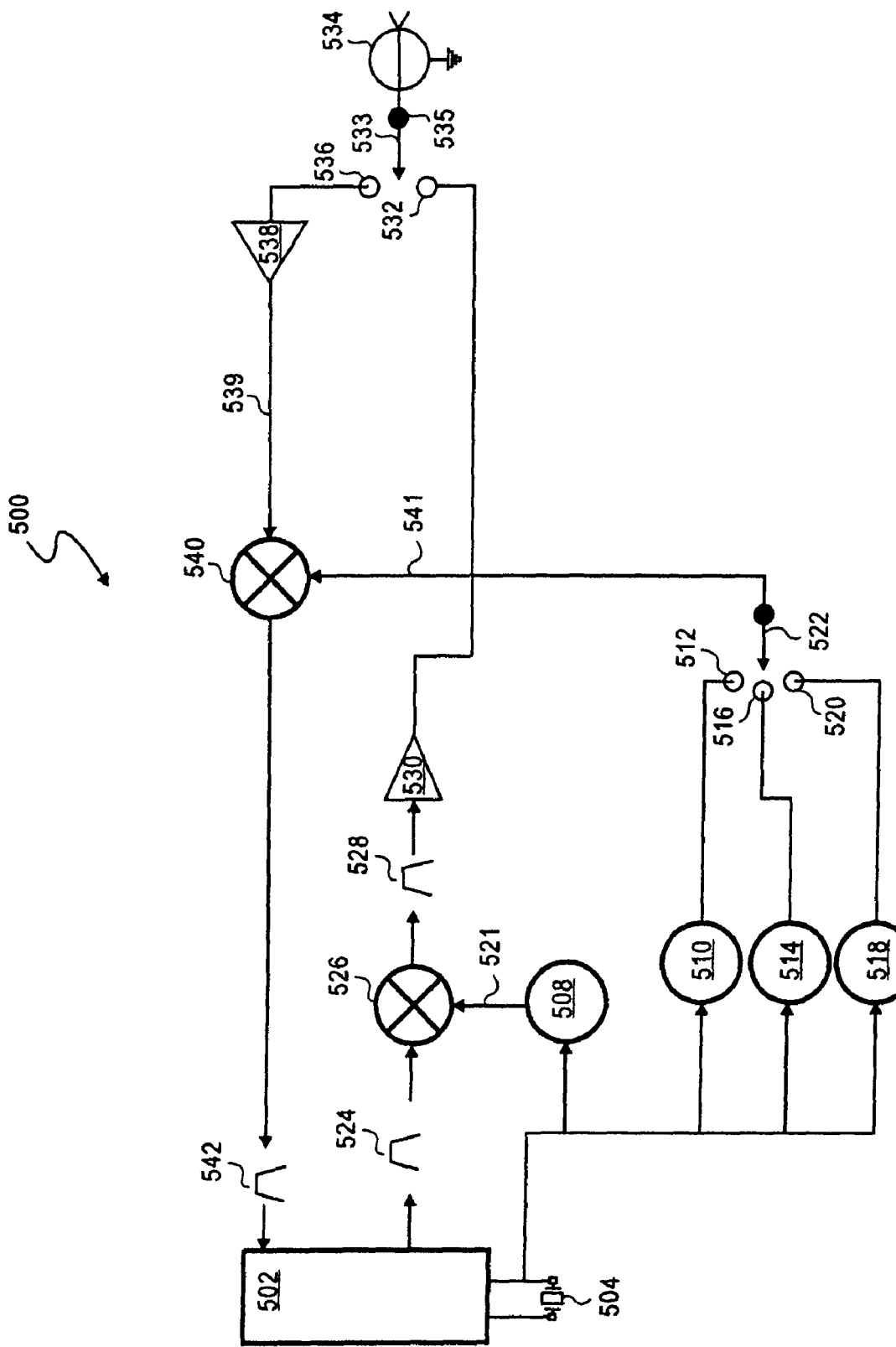
FIG. 5A shows a block diagram of an embodiment of a WAP located in a communication gateway.
Figure 5B:
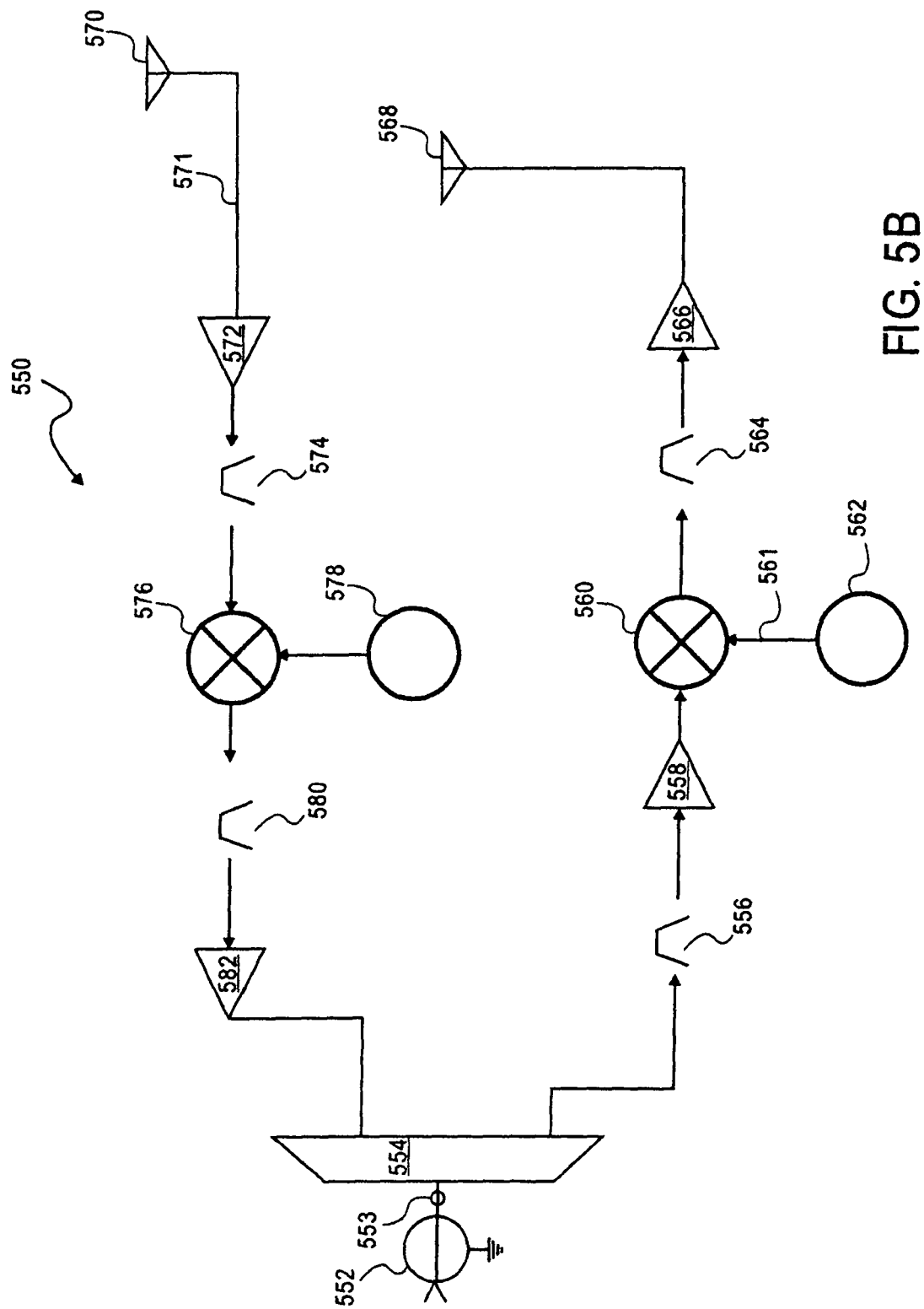
FIG. 5B shows a block diagram of an embodiment of an antenna circuit that extends a range of the WAP.

FIG. 5A shows a block diagram of an embodiment of a WAP located in a communication gateway. FIG. 5B shows a block diagram of an embodiment of an antenna circuit that extends a range of the WAP 500. In one embodiment, the WAP 500 is coupled to the antenna circuit 550 via a coaxial line.

The communication gateway 106 may be a wide area network, digital subscriber line, or other similar gateway that provides an interface combined with various wide and/or local area networking (LAN) technologies to enable sharing the broadband access with other computers or devices. The communication gateway 106 may have a WAP 108 or similar WAP 500 that is located in the NID 104 which is coupled to the DSLAM 102. The NID 104 has an input to receive a signal from the DSLAM 102 with the signal being carried across a public telephone network as illustrated in FIG. 1.

In some embodiments, multiple antenna circuits 550, each utilize a different receive frequency on the coaxial line, but not on the airwaves, in order to provide a local area with good radio coverage. The WAP 500 in the NID 104 can listen to all of the multiple antenna circuits 550 in turn. The WAP 500 transmits to all of the multiple antenna circuits 550 simultaneously. Hence, isolated remote users will not transmit unless they are allowed to do so by the WAP 500.

The WAP 500 includes a radio 502, an oscillator 504, and local oscillators 508, 510, 514, and 518 that each generate a signal to be mixed in a frequency converter 526 or 540. In at least certain embodiments, the radio 502 generates a RF transmit signal 524 with a frequency range of 2000 to 6000 MegaHertz (MHz). The transmit signal 524 is sent from the radio 502 to the frequency converter 526 to be mixed with a signal 521 received from the local oscillator 508. In one embodiment, the frequency converter 526 generates or converts a signal 528 with a frequency range of 60-80 MHz based on the signal 524 having a frequency range of 2400-2474 MHz and the signal 521 having a frequency of approximately 2367 MHz. In some embodiments, the frequency converter 526 may produce the sum and difference of the signals 521 and 524 and then remove the sum signal with a filter in order to generate the difference signal 528. An amplifier 530 sends the signal 528 to a node 532 for transmission to the antenna circuit 550 when the switch 533 contacts the node 532. A connector 534 connects to a coaxial cable that transfers the signal 528 from one or more ports 533 of the WAP 500 to a connector 552 coupled to the antenna circuit 550. The frequency converter 526 converts a frequency of the signal 524 into a frequency of the signal 528 in order to minimize the attenuation caused by the coaxial cable and associated splitters that transfer the signal 528 from the WAP 500 to the antenna circuit 550. Thus, less gain is required from any transmit amplifier such as the amplifiers 530, 558, and 566.

The antenna circuit 550 includes one or more ports 553, a diplexer 554, transmit amplifiers 558 and 566 that amplify a signal 556 and a signal 564, respectively, and receive amplifiers 572 and 582 that amplify a signal 574 and a signal 580, respectively. The diplexer 554 sends the signal 556 to the amplifier 558 that amplifies and sends the signal 556 to a frequency converter 560. A signal 564 is generated by the frequency converter 560 based on a frequency of the signal 556 and a frequency of a signal 561 generated by a local oscillator 562.

In one embodiment, the frequency converter 560 generates the signal 564 with a frequency range of 2400-2480 MHz based on the signal 556 having a frequency range of 1400-1480 MHz and the signal 561 having a frequency of approximately 1000 MHz. The amplifier 566 sends the signal 564 to a transmit antenna 568. One or more wireless devices within a certain range of the antenna 568 receive the signal 564. The one or more wireless devices may also transmit communications to a receive antenna 570 that sends these communications in the form of one or more receive signals 571 to the amplifier 572. A converter 572 generates a signal 580 based on a frequency of the signal 574 and a frequency of a signal 577 generated by a local oscillator 578.

In one embodiment, the frequency converter 576 generates the signal 580 with a frequency range of 1000-1080 MHz based on the signal 574 having a frequency range of 2400-2480 MHz and the signal 578 having a frequency of approximately 1400 MHz. In another embodiment, the frequency converter 576 generates the signal 580 with a frequency range of 1100-1180 MHz based on the signal 574 having a frequency range of 2400-2480 MHz and the signal 578 having a frequency of approximately 1300 MHz. In another embodiment, the frequency converter 576 generates the signal 580 with a frequency range of 1200-1280 MHz based on the signal 574 having a frequency range of 2400-2480 MHz and the signal 578 having a frequency of approximately 1200 MHz. In at least certain embodiments, multiple frequencies across a cable or coaxial line may be employed. In the case of the receive direction, multiple remote antenna circuits 550 all simultaneously transmit on the cable at different frequencies.

Multiple antenna circuits 550 may simultaneously operate with each one generating a different frequency range or band as discussed above for the generated signal 580. The amplifier 582 sends the signal 580 to the diplexer 554 for transferring back to the WAP 500 via the connector 552 and the coaxial cable.

The frequency converter 576 converts a frequency range or band of the signal 574 into a frequency range or band of the signal 580 in order to minimize the attenuation of the coaxial cable and associated splitters that transfer the signal 580 from the antenna circuit 550 to the WAP 500. Thus, less gain is required from any receive amplifier such as the amplifiers 572, 582, and 538.

In FIG. 5A, the connector 534 receives the signal 580 which is received by the amplifier 538 if the switch 533 contacts a node 536. The amplifier 538 amplifies and sends a signal 539 to the frequency converter 540 based on the signal 580.

In one embodiment, the frequency converter 540 generates the signal 542 with a frequency range of 2400-2480 MHz based on the signal 539 having a frequency range of 1000-1080 MHz and a signal 541 having a frequency of approximately 1400 MHz. In another embodiment, the frequency converter 540 generates the signal 542 with a frequency range of 2400-2480 MHz based on the signal 539 having a frequency range of 1100-1180 MHz and the signal 541 having a frequency of approximately 1300 MHz. In another embodiment, the frequency converter 540 generates the signal 542 with a frequency range of 2400-2480 MHz based on the signal 539 having a frequency range of 1200-1280 MHz and the signal 541 having a frequency of approximately 1200 MHz. Switch 522 or other means can be used to select a frequency for signal 541 based on the frequency range of the signal 539. The frequency converter 540 sends the signal 542 to the radio 502. The signal 542 can be transmitted across a public telephone line to a DSLAM 102 as illustrated in FIG. 1.

In a heterodyne frequency scheme illustrated in FIGS. 5A and 5B, the radio signals are sent through a coaxial line in a frequency band lower than the frequency band generated by the radio 502. Typically this lower frequency band will be a frequency in the range of 50 MHz to 1500 MHz. The coaxial line and associated splitters in a building or residence have less attenuation at these frequencies, so less gain is required in the amplifiers. Then, the radio signal 556 is converted to the desired frequency as illustrated in FIG. 5B.

In the case of transmission from the DSL communication gateway 106, the desired frequency may be in one of the standard ISM bands, 2400-2474 MHz or 5 GHz. In the case of reception by the DSL communication gateway 106, the conversion may be up to those same bands, or with a specially adapted radio, it may be to an intermediate frequency or to a baseband frequency.

Further, in the heterodyne frequency scheme, the transmit and receive paths do not need to be on the same frequency. If the transmit and receive paths are sufficiently separate in frequency, then both a remote receive amplifier and a remote transmit amplifier may be always activated without undesirable oscillation occurring. Thus, no control signal is required to switch between transmit and receive.

Separate transmit and receive antennas may be employed as illustrated in FIG. 5B, or the receiver and transmitter may share them by means of a combiner or circulator. In the case where there is no out-of-band control signal, it may nevertheless be necessary for each end of the link to learn about the gain required. This may be accomplished in-band by special transmission sequences which may cause a remote station such as the antenna circuit 550 to enter a loop-back mode. Gain may then be adjusted to achieve optimum performance. Further, in the heterodyne frequency scheme, multiple remote antenna circuits may be deployed throughout a building. Each remote circuit 550 may operate on a different frequency. The DSL communication gateway 106 may contain means to receive one of these different frequencies at a given instant in time. The DSL communication gateway 106 may select the frequency with the highest quality signal or based on some other criteria such as a round robin sequence.

The transmit amplifiers may all operate on the same frequency, and all transmit simultaneously. It may not be necessary to employ a control scheme if the transmit intermediate frequency is sufficiently different from the receive intermediate frequency. Each amplifier may operate at a fixed gain. This gain may have to be set to avoid distortion on paths with very little attenuation. Thus paths with more attenuation may suffer excess loss.

A better scheme may be to employ the control scheme as described in FIGS. 3A and 3B, with modification. An optional AGC may modify the gain of transmit amplifiers as previously discussed. However, the transmit AGC value should not be used to adjust the receive gain, because the receive frequency on the cable is likely to be different from the transmit frequency on the cable. In this case, a loopback mode, as described above, may be necessary. First, the correct transmit gains may be established. Then, a loopback adjustment based on the loopback mode may be entered and the receive gain may be adjusted. A remote control circuit may consist of either a small microcontroller or a state machine, along with the associated demodulator and modulator. The best place to adjust the receive channel gain is at a remote receive amplifier such as amplifiers 572 and/or 580 because this saves power compared to adjusting the receive gain at the DSL communication gateway 106. Similarly, the best place to adjust the transmit channel gain is at a transmit amplifier of the DSL communication gateway 106 such as amplifier 530.

Figure 6:
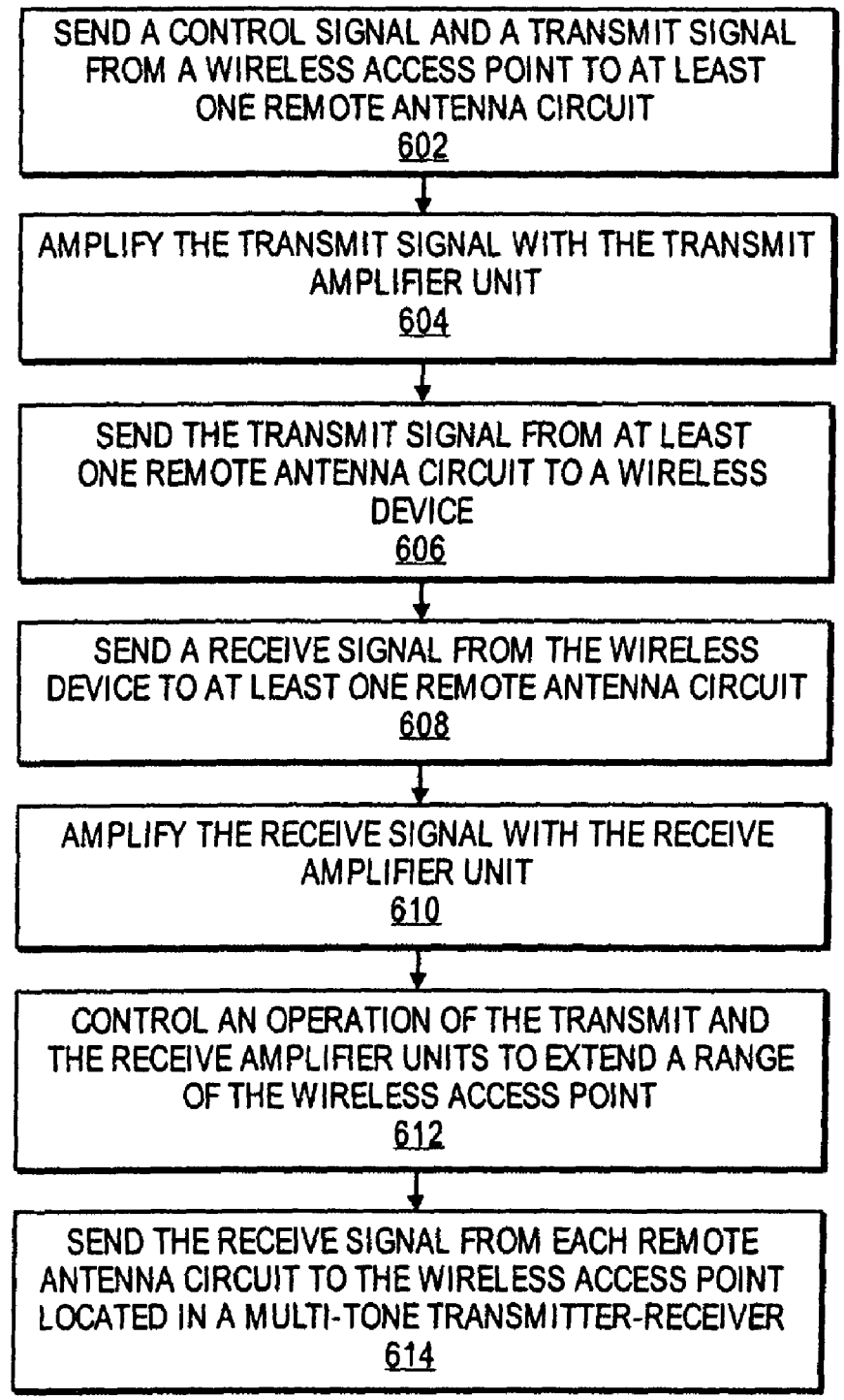
FIG. 6 shows a method for providing a wireless LAN with a WAP.

FIG. 6 shows a method for providing a wireless LAN with a WAP. The method 600 includes sending a control signal and a transmit signal from a wireless access point to at least one remote antenna circuit at block 602. Each remote antenna circuit includes a transmit amplifier unit, a receive amplifier unit, and control unit to receive the control signal. The method 600 further includes amplifying the transmit signal with the transmit amplifier unit at block 604. The method 600 further includes sending the transmit signal from at least one remote antenna circuit to a wireless device at block 606. The method 600 further includes sending a receive signal from the wireless device to at least one remote antenna circuit at block 608. The method 600 further includes amplifying the receive signal with the receive amplifier unit at block 610. The method 600 further includes controlling an operation of the transmit and the receive amplifier units to extend a range of the wireless access point at block 612. The method 600 further includes sending the receive signal from each remote antenna circuit to the wireless access point located in a multi-tone transmitter-receiver at block 614.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

Thus, according to embodiments of the present disclosure, systems and methods for extending a range of a WAP with one or more remote antenna circuits are described. In one embodiment, at least one remote antenna circuit receives a control signal and a transmit signal transmitted from the WAP located in a multi-tone transmitter-receiver. Each remote antenna circuit includes a transmit amplifier unit that amplifies the transmit signal, a receive amplifier unit that amplifies a receive signal, and control unit that receives the control signal generated by the WAP. The control unit controls an operation of the transmit and the receive amplifier units to extend the range of the WAP with the at least one remote antenna circuit. In another embodiment, a heterodyne frequency scheme provides communications between the WAP and each remote antenna without control unit for controlling transmit and receive amplifier units.

While some specific embodiments of the disclosure have been shown the disclosure is not to be limited to these embodiments. For example, most functions performed by electronic hardware components may be duplicated by software emulation. Thus, a software program written to accomplish those same functions may emulate the functionality of the hardware components. The hardware logic may consist of electronic circuits that follow the rules of Boolean Logic, software that contain patterns of instructions, or any combination of both. The disclosure is to be understood as not limited by the specific embodiments described herein, but only by scope of the appended claims.

What is claimed is:

1. A system comprising:
    a network interface device (NID) having a wide area network communication gateway with an wireless access point that has a first frequency converter to convert a transmit signal with a first frequency band into a second frequency band;
    an input to receive the transmit signal from a digital subscriber loop access multiplexer with the transmit signal carried across a public telephone network to the NID; and
    one or more ports of the wireless access point to transmit the transmit signal to at least one antenna circuit coupled to the wide area network communication gateway via a coaxial cable, one or more ports of each antenna circuit to receive the transmit signal from the one or more ports of the wireless access point and to convert the second frequency band into the first frequency band with a second frequency converter, an antenna of each antenna circuit to receive a receive signal with the first frequency band and to convert the first frequency band into a third frequency band with a third frequency converter, the receive signal is sent to the wireless access point, the second and third frequency bands are selected to minimize the attenuation of the transmit and receive signals between the wireless access point and each antenna circuit.

2. The system of claim 1, wherein each antenna circuit to extend a range of the wireless access point located in the wide area network communication gateway that is a digital subscriber line communication gateway.

3. The system of claim 1, wherein each antenna circuit comprises the third frequency converter to convert the receive signal with the first frequency band into one of a plurality of frequency bands with each one of the plurality of frequency bands being associated with a different antenna circuit.

4. The system of claim 3, wherein each antenna circuit further comprises:
    one or more transmit amplifiers to amplify the transmit signal; and
    one or more receive amplifiers to amplify the receive signal.

5. The system of claim 4, wherein each one of the plurality of frequency bands associated with the receive signal of a different antenna circuit is different than the second frequency band of the transmit signal in order to provide communication between the wireless access point and each remote antenna without control unit to control the transmit and receive amplifiers.

6. The system of claim 1, wherein each antenna circuit further comprises an automatic gain controller to control a gain of the one or more transmit amplifiers based on a power detector detecting the output power level of the one or more transmit amplifiers.

7. The system of claim 6, wherein the automatic gain controller to control a gain of the one or more receive amplifiers based on the gain of the one or more transmit amplifiers and a loopback adjustment.

8. An apparatus, comprising:
    means for sending a control signal and a transmit signal from a wireless access point to at least one remote antenna circuit via a coaxial line with each remote antenna circuit having a transmit amplifier unit to amplify the transmit signal, a receive amplifier unit to amplify a receive signal, and control unit to receive the control signal;
    means for determining an amount of control signal loss from transmission of the control signal over the coaxial line;
    means for adjusting a gain of at least one of the transmit amplifier unit and the receive amplifier unit located in the remote antenna circuit in response to the determination of the amount of the control signal loss; and
    means for sending the receive signal from each remote antenna circuit to the wireless access point located in a multi-tone transmitter-receiver.

9. The apparatus of claim 8, further comprising:
    means for adjusting a gain of at least one of a transmit amplifier unit and a receive amplifier unit located in the wireless access point in response to the determination of the control signal loss.

* * * * *